(12) United States Patent
Fishman

(10) Patent No.: US 6,990,258 B2
(45) Date of Patent: Jan. 24, 2006

(54) OPTICAL MODULATOR

(75) Inventor: Tal Fishman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 126 days.

(21) Appl. No.: 10/470,000

(22) PCT Filed: Mar. 25, 2002

(86) PCT No.: PCT/US02/16848

§ 371 (c)(1), (2), (4) Date: Sep. 17, 2003

(87) PCT Pub. No.: WO02/093238

PCT Pub. Date: Nov. 21, 2002

(65) Prior Publication Data

US 2004/0105605 A1 Jun. 3, 2004

Related U.S. Application Data

(60) Provisional application No. 60/277,989, filed on Mar. 23, 2001.

(51) Int. Cl.
*G02F 1/00* (2006.01)
*G02F 1/01* (2006.01)
*G02F 1/35* (2006.01)
*G02F 1/295* (2006.01)
*G02F 1/03* (2006.01)
*G02F 1/07* (2006.01)
*G02B 26/00* (2006.01)

(52) U.S. Cl. .................. 385/2; 385/1; 385/8; 359/237; 359/238; 359/245; 359/247

(58) Field of Classification Search .................... 385/1, 385/2; 359/237, 238, 245, 247
See application file for complete search history.

(56) References Cited

U.S. PATENT DOCUMENTS

| | | | | |
|---|---|---|---|---|
| 5,787,211 A | * | 7/1998 | Gopalakrishnan | 385/2 |
| 5,798,856 A | * | 8/1998 | Suzuki et al. | 398/183 |
| 5,933,271 A | * | 8/1999 | Waarts et al. | 359/341.31 |
| 6,101,300 A | * | 8/2000 | Fan et al. | 385/27 |
| 6,407,505 B1 | * | 6/2002 | Bertsche | 315/5.41 |
| 6,744,548 B2 | * | 6/2004 | Abeles | 359/254 |

OTHER PUBLICATIONS

Villeneuve et al., "Single–mode waveguide microcavity for fast optical switiching", Optics Letters, vol. 21, No. 24, 2017 (1996).*

* cited by examiner

*Primary Examiner*—Brian Healy
*Assistant Examiner*—Charlie Peng
(74) *Attorney, Agent, or Firm*—Blakely, Sokoloff, Taylor & Zafman LLP

(57) ABSTRACT

An optical modulator consists of an electrical input for receiving an electrical control signal, an optical output for outputting an optical signal, and at least two optical cavities coupled together according to a set of coupling parameters. The electrical control signal frequency is in a narrow frequency band, and the coupling parameters are selected to match the modulator frequency band of operation.

73 Claims, 11 Drawing Sheets

(A)

The various field in a cavity with externally injected light

OPTICAL MODULATOR

RELATED PATENT APPLICATION

This application is a National Phase Application of PCT/US02/16848 International Filing Date 25 Mar. 2002, which claims priority from U.S. Provisional Patent Application No. 60/277,989 filed 23 Mar. 2001.

FIELD OF THE INVENTION

The present invention relates to an optical modulator and more particularly but not exclusively to a narrow-band optical modulator with very short optical cavity structure.

BACKGROUND OF THE INVENTION

In the last twenty years optical modulation techniques have become increasingly important in data communication systems. A variety of optical devices have been developed. In some applications, such as for obtaining return to zero (RZ) modulation formats, narrow-band modulators are of significant importance. One such device is a double cavity device (DCD), which consists of two coupled cavities. An RF field applied externally to the DCD determines the amount of optical power transferred to the output port of the device. Prior art describes only a double cavity device (DCD), but does not explain how to optimize the structure of a practical device.

A schematic illustration (top view) of a DCD is presented in FIG. 1. The device is implemented utilizing two coupled waveguides with highly reflecting mirrors at each end of the waveguides. A physical model and structure of coupled waveguide devices are presented in Griffel, G. (1993). "Very short intra-cavity directional coupler for high-speed communication." *Appl. Phys. Lett.* 63(2): 135–7, Nir, D. PhD Thesis "Novel Integrated Optic devices based on irregular waveguide features" Tel-Aviv university 1996, and Nir, D. and S. Ruschin (1992). "Very short integrated optic Fabry-Perot Cavity-Coupler switch for DC and High bandwidth operation." *IEEE JQE* 28(11): 2544–50, contents of which are hereby incorporated by reference. The DCD structure is described in international patent application number PCT/IL01/00196, the contents of which are hereby incorporated by reference. In the configuration shown in FIG. 1, two mirrors, 101 and 102, confine a Fabry-Perot cavity 103. The coupled waveguide in the cavity 103 support two or more normal modes (i.e., the zero order symmetric and anti-symmetric modes, the first order symmetric and anti-symmetric modes etc. . . . ), each having a different resonance frequency. A continuous wave (CW), or slowly varying light source, is injected to the device via the input waveguide 104. The light enters the cavity 103 through a semi-reflective input/output (IO) mirror 102. The injected light is distributed between the various normal modes according to the amount of spatial overlapping between each of the normal modes and the injected field. When the optical length of the cavity is properly phase-tuned, the injected light of a specific normal-mode is amplified to a level depending on the structure parameters. The phase tuning determines which of the normal modes is amplified. All of the normal modes are coupled to the output waveguide 105 via the IO mirror 102. The phase difference between the modes, as well as the power of the various normal modes in the cavity, determines the amount of power that couples to the output waveguide 105. Thus, for example, if the symmetric and anti-symmetric modes are added in-phase with identical power carried by each mode, a vanishingly small power couples to the output waveguide, whereas if they are added with a 180° phase difference the output power at the output waveguide 105 is maximal.

To control the transmission state of the device, an electrical radio frequency (RF) voltage signal is applied to an electrode set properly positioned about the waveguides. The electrical field produced by the electrodes modifies the optical refractive index of the waveguides at the interaction zone via the electro-optic effect, affecting both the coupling and the relative phase between the normal modes in the cavity, and therefore modulating the output transmission.

Optimal performance of the device (i.e. an infinitely large extinction-ratio with low attenuation and with very low RF drive voltage) is obtained if the applied RF narrow-band field resonantly amplifies the coupling between the modes. No method currently exists for optimizing DCD performance. It is not currently possible to provide the conditions needed to bring the DCD to the optimal performance level. Additionally, prior art considers only a dual-cavity device, but not devices utilizing more than two cavities or devices having optical gain within the modulator.

SUMMARY OF THE INVENTION

According to a first aspect of the present invention there is thus provided an optical modulator comprising an electrical input for receiving an electrical control signal in a narrow frequency band, an optical output for outputting an optical signal, and at least two optical cavities coupled together according to a set of coupling parameters selected to match the narrow-band.

Preferably each of the cavities comprises an optical waveguide.

Preferably the optical modulator further comprises an optical input for light injection.

Preferably the modulator is operable to internally generate light.

Preferably the modulator is operable to shift an optical wavelength of the optical signal according to the electrical control signal so as to redistribute power between resonant modes of the modulator.

Preferably the modulator is operable as a data modulator.

Preferably the modulator is operable as a narrow-band data modulator.

Preferably the modulator is operable as a sinusoidal amplitude modulator.

Preferably the modulator is operable simultaneously as a sinusoidal amplitude modulator and as a data modulator.

Preferably the modulator is operable as a single sideband (SSB) modulator.

Preferably the modulator is operable to modulate the optical signal with an electric control signal having a predetermined modulation frequency within the narrow-frequency band, the modulation dropping as the modulation frequency departs from the narrow-band.

Preferably the optical modulator further comprises a phase tuner for tuning a phase of the cavity.

Preferably the optical modulator further comprises a coupling coefficient adjuster for adjusting a coupling coefficient between the cavities.

Preferably the optical modulator further comprises a mode coupling rate adjuster for adjusting a normal mode coupling rate between resonant modes of the modulator.

Preferably a phase of the modulator is tunable such that a mode of the modulator is at resonance.

Preferably a phase of the modulator is tunable such that a mode of the modulator is at resonance.

Preferably the modulator has an optical length such that a mode of the modulator is at resonance.

Preferably one of the modes is at resonance.

Preferably a coupling coefficient between the cavities is adjustable such that a frequency difference between a resonant frequency of a first mode of the coupled cavities and a resonant frequency of a second mode of the coupled cavities substantially matches an integer multiple of the modulation frequency.

Preferably a coupling coefficient between the cavities is adjustable such that a frequency difference between a resonant frequency of a first mode of the coupled cavities and a resonant frequency of a second mode of the coupled cavities substantially matches an integer multiple of the modulation frequency.

Preferably, the coupling coefficient comprises a waveguide coupling coefficient.

Preferably the modulator has a coupling coefficient such that a frequency difference between a resonant frequency of a first mode of the coupled cavities and a resonant frequency of a second mode of the coupled cavities substantially matches an integer multiple of the modulation frequency.

Preferably a frequency difference between a resonant frequency of a first mode of the modulator and a resonant frequency of a second mode of the modulator substantially equals an integer multiple of the modulation frequency.

Preferably, the normal mode coupling rate is adjustable such that the coupling rate substantially equals a total optical loss in the cavities of the modulator.

Preferably a coupling rate between resonant modes of the modulator is adjustable such that the normal mode coupling rate substantially equals a total optical loss in the cavities of the modulator.

Preferably the modulator has a coupling rate between resonant modes of the modulator such that the normal mode coupling rate substantially equals a total optical loss in the cavities of the modulator.

Preferably, the second optical signal comprises a narrow-band signal.

Preferably, the control signal comprises a narrow-band signal.

Preferably a first mode comprises a symmetric mode of the modulator and the second mode comprises an anti-symmetric mode of the modulator.

Preferably the optical modulator further comprises a signal generator, for generating the control signal.

Preferably, a type of at least one of the cavities includes one of a group comprising: Fabry-Perot cavity, distributed feedback (DFB) cavity, distributed Bragg reflection (DBR) cavity, vertical cavity, metallic cavity, circular cavity, race track cavity, triangular cavity, free space cavity, photonic bandgap cavity, and multimode cavity.

Preferably the control signal comprises an anti-symmetric signal.

Preferably the control signal comprises a single-sided signal.

Preferably the modulator is operable as an optical clock.

Preferably, an oscillation frequency of the optical clock comprises an integer multiple of the modulation frequency.

Preferably the optical modulator further comprises a first and a second mirror associated with the cavities, and wherein the first mirror comprises a semitransparent mirror thereby to couple the cavities.

Preferably, the second mirror comprises a semitransparent mirror.

Preferably, the second mirror comprises a fully reflective mirror.

Preferably, the first mirror comprises a modulator output.

Preferably, the second mirror comprises a modulator output.

Preferably the modulator has optical gain.

Preferably, the modulator is operable to self-oscillate at the modulation frequency.

Preferably the modulator comprises at least three optical cavities, thereby to operate at more than one modulation frequency.

Preferably the modulator comprises at least three optical cavities, thereby to operate over a predetermined bandwidth.

According to a second aspect of the present invention there is thus provided an optical modulator comprising an electrical input for receiving a narrow-band electrical control signal at an externally selected control frequency, an optical output for outputting an optical signal from the modulator, and at least one optical cavity associated with the electrical input and the optical output, arranged to support at least two optical modes having respective resonance wavelengths selected in accordance with the control frequency.

Preferably, the optical modulator is operable to shift an optical wavelength of an optical signal according to the electrical control signal, thereby to control optical power in resonant modes of the cavity.

Preferably, the externally selected control signal frequency is set to have a period significantly shorter than the lifetime of photons within the cavity.

Preferably, the optical modes comprise axial cavity modes.

Preferably, the optical modes comprise normal modes.

Preferably, the optical modes comprise normal waveguide modes.

Preferably the modulator has comprising an optical input for light injection.

Preferably the modulator has an internal optical gain of substantially one.

Preferably the modulator has an internal optical loss.

Preferably the modulator has comprising a second cavity coupled to the first cavity according to a set of coupling parameters selected to define the narrow-band.

Preferably the modulator is further operable to shift an optical wavelength of an injected optical signal according to characteristics of the electrical control signal, thereby to redistribute power between resonant modes of the modulator.

Preferably, a frequency separation of two of the optical modes corresponds to an integer multiple of the externally selected control frequency, thereby to oscillate at the control frequency.

According to a third aspect of the present invention there is thus provided a method for providing an optical signal modulated with a selectable frequency, the method comprising applying an electromagnetic control signal to an optical cavity, such that an optical wavelength of an optical signal is shifted by the electromagnetic control signal so as to redistribute power between resonant modes of the modulator, injecting an optical signal into the coupled cavities, and applying an electromagnetic control signal to the coupled cavities.

Preferably, the optical cavity comprises at least two coupled waveguides.

Preferably, the method comprises the further step of adjusting coupling coefficients between the cavities such that a frequency difference between a resonant frequency of a first mode of the coupled cavities and a resonant frequency of a second mode of the coupled cavities substantially equals an integer multiple of a modulation frequency of the control signal.

Preferably, the method comprises the further step of phase tuning the coupled cavities such that a mode of the coupled cavities is at resonance.

Preferably, the method comprises the further step of adjusting a coupling rate between a first mode and a second mode of the coupled cavities such that the normal mode coupling rate substantially equals a total optical loss of the coupled cavities.

Preferably, the injected optical signal comprises a narrow-band signal.

Preferably, the control signal comprises a narrow-band signal.

Preferably, a first mode of the coupled cavities comprises a symmetric and a second mode of the coupled cavities comprises an anti-symmetric mode.

Preferably, a type of at least one of the cavities includes one of a group comprising: Fabry-Perot cavity, circular cavity, race track cavity, free space cavity, photonic bandgap cavity, and multimode cavity.

Preferably, the control signal comprises an anti-symmetric signal.

Preferably, the control signal comprises a single-sided signal.

Preferably, the modulated optical signal comprises an optical clock signal.

Preferably, an oscillation frequency of the optical clock signal comprises a modulation frequency of the control signal.

Preferably, the coupled cavities comprise at least three optical cavities thereby to operate at more than one modulation frequency of the control signal.

Preferably, the coupled cavities comprise at least three optical cavities thereby to operate over a predetermined bandwidth of the control signal.

According to a fourth aspect of the present invention there is thus provided a method for manufacturing a narrow-band optical modulator, the method comprising: coupling together two optical cavities, adjusting coupling coefficients between the cavities such that a frequency difference between a resonant frequency of a first mode of the coupled cavities and a resonant frequency of a second mode of the coupled cavities substantially equals an integer multiple of a modulation frequency within the frequency range, phase tuning the coupled cavities such that one of the modes is substantially at resonance, and adjusting a coupling rate between the resonant modes such that the normal mode coupling rate substantially equals a total optical loss of the modulator.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DESCRIPTION OF THE PREFERRED EMBODIMENTS

Figure 1:
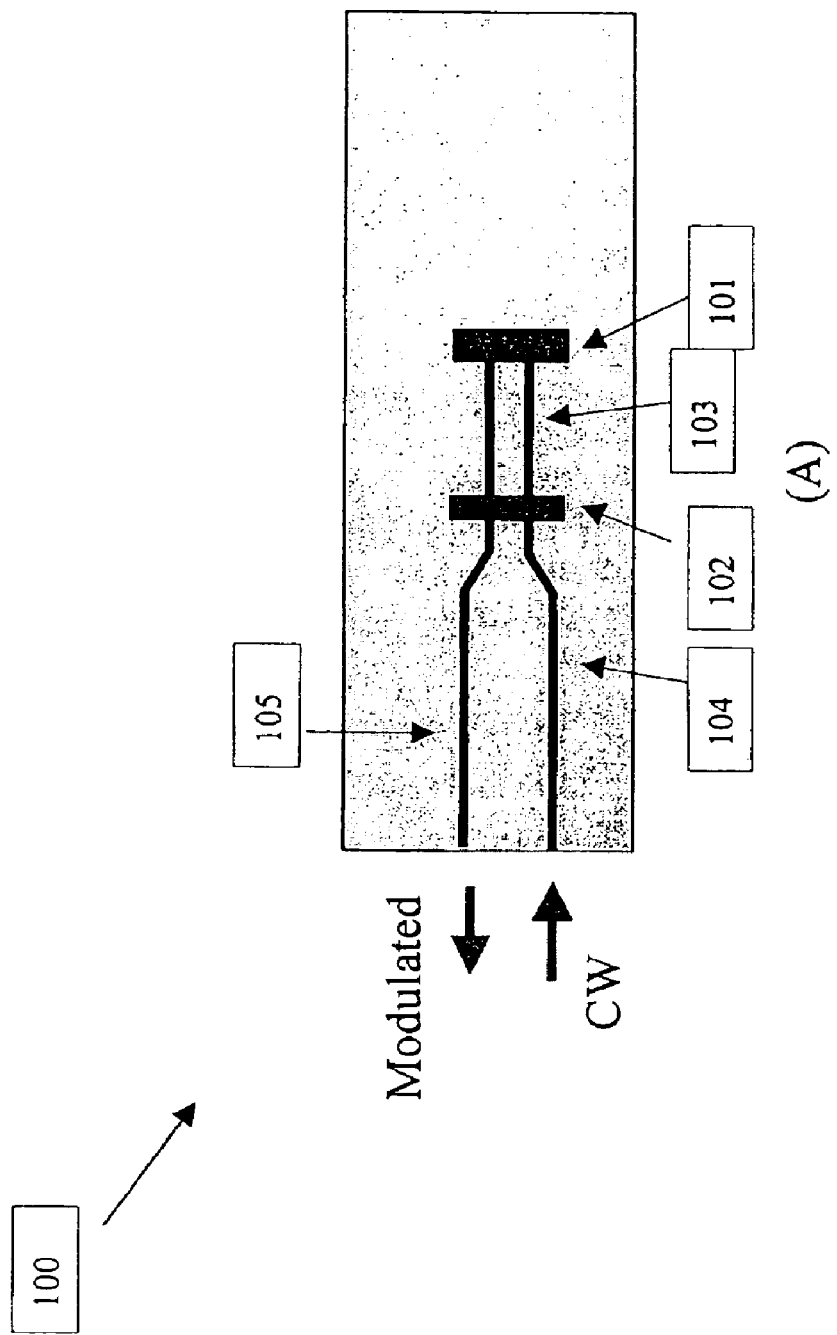
FIG. 1 is a schematic illustration (top view) of a DCD.

With the widespread usage of optical communication systems, a high demand has developed for efficient optical modulators. The system and method described below enable the realization of an efficient narrow-band ultra-high-frequency optical modulator. For efficient operation, the modulator parameters, such as coupling coefficient(s), cavity-finesses, waveguide width and separation, and applied voltage must be carefully selected. An externally applied RF field controls the amount of optical power transferred to the modulator output port.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 2:
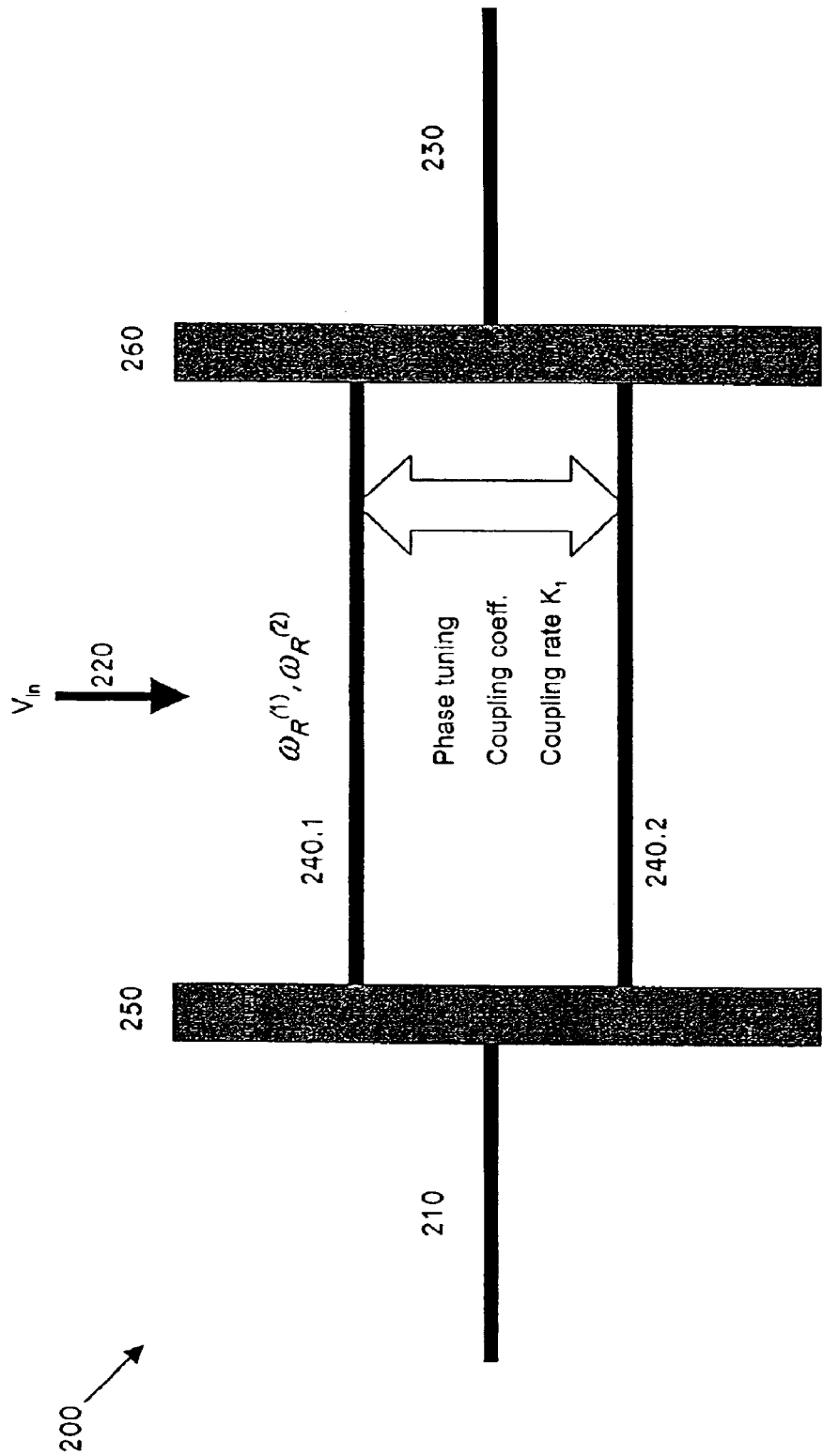
FIG. 2 is a simplified block diagram of a narrow-band optical modulator according to a preferred embodiment of the present invention.

Reference is now made to FIG. 2, which is a simplified block diagram of a preferred embodiment of an optical modulator 200. Optical modulator 200 consists of an electrical input 220 for receiving an electrical control signal, an optical output 230 for outputting an optical signal in said narrow-band, and one or more optical cavities 240.1 to 240.n. In the preferred embodiment the modulator has two coupled optical cavities, shown in FIG. 2 as 240.1 . . . 240.2. However, the modulator may consist of a single optical cavity, or even three or more cavities (as described below), provided the optical resonance modes are properly separated. In the preferred embodiment each of the cavities is a waveguide, so that the coupled cavities are essentially coupled waveguides. The optical signal controlled by the optical modulator may be an external optical signal injected into the device through an optical input 210, or may be internally generated by the modulator itself. The optical source may be provided by any device capable of generating an optical signal of the required wavelength and power, such as a distributed feedback (DFB) laser.

The modulator resonance mode type will depend upon modulator implementation, and may be axial cavity modes, normal modes, or normal waveguide modes. In the preferred implementation, the electrical control signal is a narrow-band signal, with a known or externally selected frequency within a narrow-band frequency range.

In the preferred embodiment modulator 200 also has at least one coupling element (for example a semi-transparent mirror as described above), coupling the light in and out of the cavity. In the preferred embodiment, shown in FIG. 2, the optical input is coupled into the device with coupling element 250, whereas coupling element 260 serves as an out-coupling element. In a second preferred embodiment a single coupling element serves for the injection of the optical input and for output of the modulated optical signal simultaneously. Other configurations are possible, as dictated by the cavity type and coupling method of the device. Cavity types include, for example, Fabry-Perot cavities, photonic bandgap cavities, distributed feedback (DFB) cavity, distributed Bragg reflection (DBR) cavity, vertical cavity, metallic cavity, various circular cavities (such as race track and triangular cavities), free space cavities, and multimode cavities.

In the preferred embodiment, the electrical signal transfers power between the resonant modes of the coupled waveguide device. An optical signal is injected into the device, or generated within the device. The electro-optic effect causes a mixing between the control signal and the optical signal, thus shifting the frequency/wavelength of the optical signal. A frequency (wavelength) shift of the optical signal occurs due to modulation/mixing of the optical signal with RF signal. RF modulation of the optical field(s) by an electro-magnetic control signal redistributes the optical power between the resonant cavity modes. The RF power in each of the modes may be either enhanced or depleted as a result. As described below, the effect of the modulating signal upon the optical signal is dependent on both device characteristics, such as optical loss, coupling coefficient (or waveguide coupling coefficient for the coupled waveguide embodiment), and coupling rate, and modulating signal characteristics, such as modulation frequency and signal strength.

In the preferred embodiment the modulator function is to modulate an optical carrier signal using an electrical control signal. Both the optical and electrical control signal may be narrow-band signals. In a further preferred embodiment, the optical modulator operates as an ultra-high frequency (UHF) sinusoidal amplitude modulator. The modulator output may serve as an optical clock signal, where the clock frequency equals the modulation frequency of the electric control signal (or some multiple of the modulation frequency), thus causing the modulator to oscillate at the control frequency. In another preferred embodiment, the modulator operates as a data modulator, possibly at a relatively low bit-rate. The data modulation may be performed simultaneously with the UHF amplitude modulation. In an additional preferred embodiment the modulator operates as a single sideband (SSB) modulator.

In the preferred embodiment, the control signal frequency is such that the control signal period is significantly shorter than the lifetime of photons within the modulator cavity. Consequently, the optical signal can be modulated with a control signal having an ultra-high frequency.

The modulation generated by the electrical control signal on the optical signal is determined by a set of modulator coupling parameters. These parameters are selected to define the desired narrow-band modulation, and are determined by the modulator design, the electro-optic effect generated by the control signal, and device operating conditions. A physical model of a cavity based modulator is presented below. The model will be used to derive the required device specifications for efficient operation.

Figure 3:
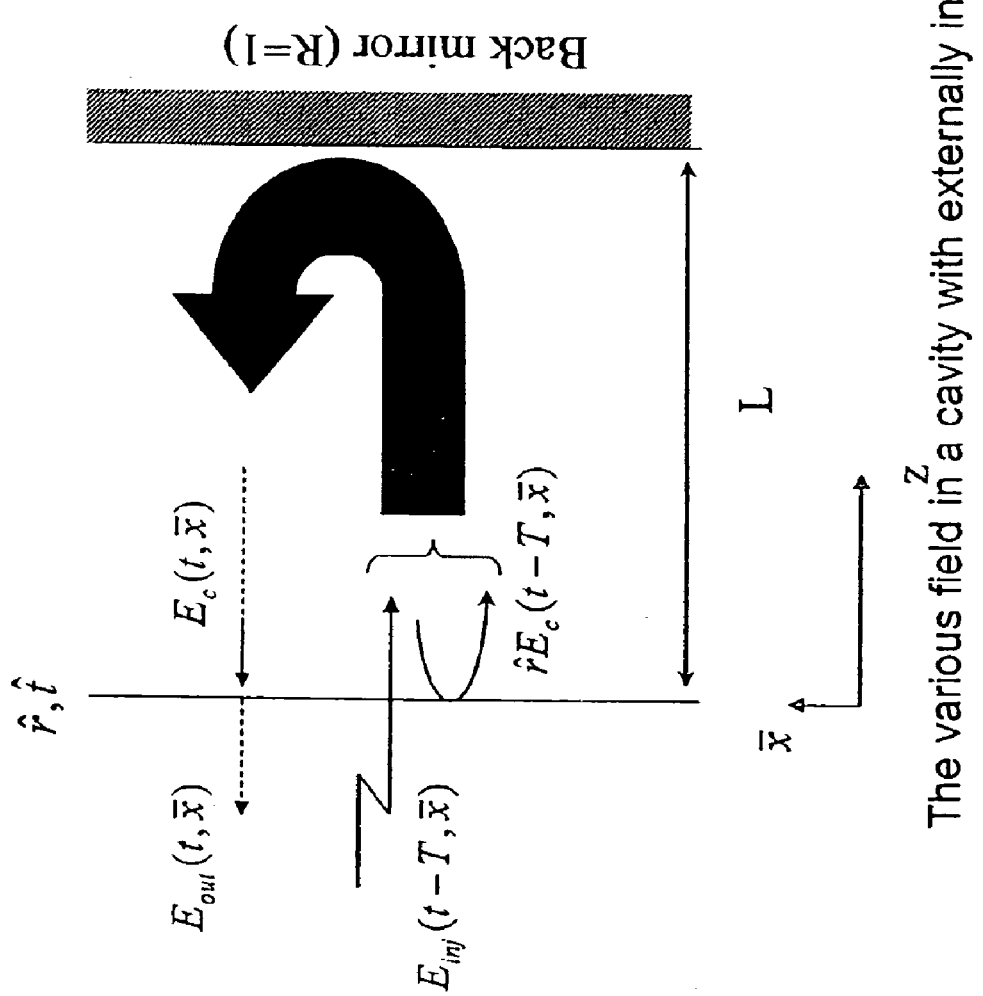
FIG. 3 shows the fields in a cavity with externally injected light.

The rate equation for the device is derived as follows. The refractive index profile in the cavity is independent of the longitudinal coordinate z, but due to an externally applied RF field $V_{RF}(t)$ and the electro-optic effect, the refractive index, n, is time dependent. Thus, $n=n(\bar{x},t)$ where $\bar{x}=(x_1,x_2)$ is the lateral coordinate and t is the time. FIG. 3 illustrates the fields in a cavity with externally injected light. As shown in FIG. 3, the following equation can be written:

$$E_c(t,\bar{x})=[\hat{i}tE_{inj}(t-T,\bar{x})+\hat{r}E_c(t-T,\bar{x})]\tilde{T}$$

where $E_c$ and $E_{inj}$ are the phasors of the circulating and injected field to the cavity, respectively. $\tilde{T}$ is an operator that propagates the fields in a cavity roundtrip, $\hat{t}$ and $\hat{r}$ are the mirror input transmission and amplitude reflections, respectively, and T is the round trip time. $E_c$, the time dependent component of $E_c$, is obtained from:

$$E_c(t,\bar{x})=\text{real}\{E_c(t,\bar{x})^*\exp(i\omega_{inj}t)\}.$$

$E_{out}$ is the phasor of the output field. Since $E_{out}(t,\bar{x})=\hat{i}tE_c(t,\bar{x})$ and $E_{out}(t-T,\bar{x})=\hat{i}tE_c(t-T,\bar{x})$, the above equation yields:

$$E_{out}(t,\bar{x})=[-\hat{t}^2E_{inj}(t-T,\bar{x})+\hat{r}E_{out}(t-T,\bar{x})]\tilde{T}.$$

Assume that within the cavity it is possible to expand the instantaneous fields utilizing the set of normal eigenmodes $\{\phi_i(\bar{x})\}$ as:

$$\begin{cases} E_{out}(t,\bar{x}) = \sum_i^{N_0} a_i(t)\phi_i(\bar{x}) = \bar{A}\cdot\tilde{\phi} \\ E_{inj}(\bar{x}) = \sum_i^{N_0} b_i\phi_i(\bar{x}) = \bar{B}\cdot\tilde{\phi} \end{cases}$$

where $\bar{A}=[a_i \ldots a_{N0}]$, $\bar{B}=[b_i \ldots b_{N0}]$ and $\tilde{\phi} = \begin{bmatrix} \phi_1(\bar{x}) \\ \phi_2(\bar{x}) \\ \phi_3(\bar{x}) \\ \vdots \\ \phi_{N_0}(\bar{x}) \end{bmatrix}$.

Without an external RF field $\{\phi_i(\bar{x})\}$ are eigenmodes of $\tilde{T}$, thus:

$$\phi_i(\bar{x})\tilde{T}=e^{-2i\beta_i L}\phi_i(\bar{x})$$

where $\beta_i$ is the propagating constant (eigenvalue) corresponding to $\phi_i(\bar{x})$. Note that provided that $2L\beta_0=2\pi N$ one may write:

$$e^{-2i\beta_i L}=e^{-2i(\beta_i-\beta_0)L}=e^{-i\Delta\omega_i T}$$

where $\Delta\omega_i T\equiv 2(\beta_i-\beta_0)L$, $T=2L/n_0$ is the cavity roundtrip time, and $n_0$ is the average refractive index (for example $n_{ext}$ the extraordinary index in Z-cut LiNb devices). Utilizing the orthogonality property of $\phi_i(\bar{x})$ yields:

$$\overline{A}(t) = -\hat{r}^2 \overline{B} e^{-i\overline{\Delta\omega}\tau} + \hat{r}\overline{A}(t-T)e^{-i\overline{\Delta\omega}\tau}$$

where $\Delta\omega$ is a diagonal matrix with elements $\Delta\omega_{ij} = \Delta\omega_i \delta_{ji}$. Denoting $\hat{r} = e^{-\alpha_m}$, or $\alpha_m = -\ln \hat{r}$, and using a Tailor series (Siegman 1986) to obtain the modal rate equation without an external RF field:

$$\frac{d\overline{A}}{dt} = -\frac{2\alpha_m}{T}\overline{B} - \left[\frac{\alpha_m}{T} + i\Delta\tilde{\omega}\right]\overline{A}$$

Figure 4:
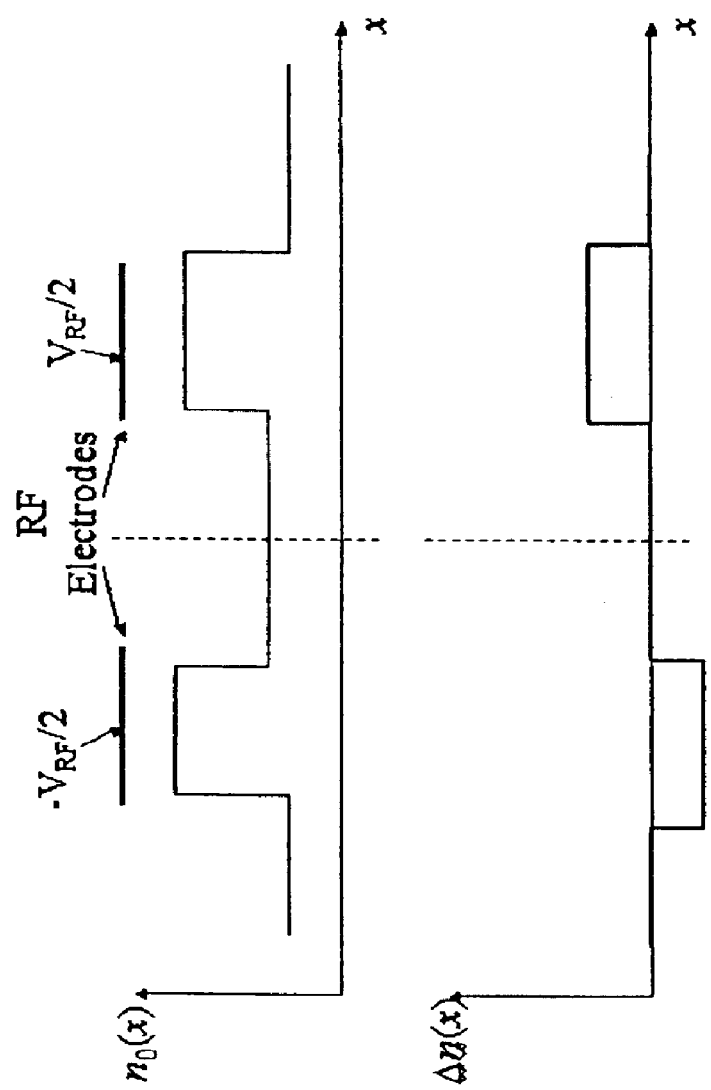
FIG. 4 is a one-dimensional schematic representation of the refractive index distribution, and the effect of the applied RF field on the refractive index.

When an electromagnetic field is externally applied to the coupled waveguides, the field modifies the refraction index. FIG. 4 is a one-dimensional schematic representation of the refractive index distribution, $n_0(x)$, in the cavity. The anti-symmetrical configuration of the RF electrodes produces an anti-symmetrical index perturbation $\Delta n(x)$. The resonant modes are coupled, so that $\hat{T}$ is no-longer diagonal. The time dependent voltage $V_{RF}(t)$ creates a time dependant index, $n(\bar{x},t) = n_0(\bar{x}) + \Delta n(\bar{x},t)$, that dynamically couples the eigen-modes. After some manipulation the following rate equation is obtained:

$$\frac{d\overline{A}}{dt} = -\frac{2\alpha_m}{T}\overline{B} - \left[\frac{\alpha_m}{T} + i\Delta\tilde{\omega} + i\tilde{K}(t)\right]\overline{A}$$

where $\Delta\omega$ and $\tilde{K}(t)$ are $N_0 \times N_0$ matrices. The matrix elements are given by:

$$\Delta\tilde{\omega}_{i,j} = \omega_0\left(\frac{\lambda_0 n_e^i}{\lambda_{in} n_{ext}} - 1\right)\delta_{ij}$$

and:

$$\tilde{K}_{i,j}(t) = \frac{\omega_{inj}}{n_{ext}^2}\int n_0(\bar{x})\Delta n(\bar{x},t)\phi_i(\bar{x})\phi_m(\bar{x})d\bar{x}$$

respectively, $w_0$ and $w_{inj}$ are given by:

$$\omega_0 = 2\pi C/\lambda_0$$

and:

$$\omega_{inj} = 2\pi C/\lambda_{inj}$$

where $\lambda_0, \lambda_{inj}$ are an arbitrarily chosen and the injected wavelengths respectively, $n_{ext}$ is the background index (the extra-ordinary index for Z-cut devices), $n^i_e$ is the effective index of the $i_{th}$ eigenmodes, and C is the speed of light.

The rate equation given above can be solved for harmonic modulation. Assuming a cosine modulation, $V_{RF}(t) = V_0 + V_1 \cos(\omega_m t)$, yields:

$$\frac{d\overline{A}}{dt} = -\frac{2\alpha_m}{T}\overline{B} - \left[\frac{\alpha_m}{T} + i\Delta\tilde{\omega}^0 + i\tilde{K}_0 + i\tilde{K}_1\cos(\omega_m t)\right]\overline{A}$$

where $\tilde{K}_0$ and $\tilde{K}_1$ are related to $V_0$ and $V_1$ respectively. Since $\overline{A}(t)$ must be periodic with period $T_m = 2\pi/\omega_m$, $\hat{A}(t)$ can be expanded in Fourier series:

$$\overline{A}(t) = \sum_{n=-\infty}^{\infty} \overline{q}_n e^{in\omega_m t}$$

Substituting $\overline{A}(t)$ into the rate equation, and after some mathematical manipulations, a series of algebraic rate equations is obtained.

$$\begin{cases} \frac{2\alpha_m}{T}\overline{B} = -\tilde{P}\overline{q}_0 - \frac{i\tilde{K}_1}{2}(\overline{q}_1 + \overline{q}_{-1}) \\ i\omega_m\overline{q}_1 = -\tilde{P}\overline{q}_1 - \frac{i\tilde{K}_1}{2}[\overline{q}_0 + \overline{q}_2] \\ -i\omega_m\overline{q}_{-1} = -\tilde{P}\overline{q}_{-1} - \frac{i\tilde{K}_1}{2}[\overline{q}_0 + \overline{q}_{-2}] \end{cases}$$

For the DCD with an anti-symmetrical electrode configuration $\Delta n$ is anti-symmetric as well (e.g., $\Delta n(-\bar{x}) = -\Delta n(\bar{x})$, see FIG. 4). Thus, since $\phi_1$ is symmetric and $\phi_2$ is anti-symmetric, $\overline{K}_{ii} = 0$ $\overline{K}_{ij} = \overline{K}_{ji}$, so that:

$$\tilde{P} = \begin{bmatrix} \alpha_m/T + i\Delta\omega_1 & iK_0 \\ iK_0 & \alpha_m/T + i\Delta\omega_2 \end{bmatrix} \quad \text{and:} \quad \tilde{K}_1 = \begin{bmatrix} 0 & K_1 \\ K_1 & 0 \end{bmatrix}$$

$K_1$ can be expressed in standard terms. $K_1$ is the coupling coefficient between the two modulator modes when the applied field is at its maximum value. $K_1$ describes the normal mode coupling rate, and is also referred to as the normal mode coupling rate. $K_1$ is proportional to the effective phase shift $\Delta n_{eff}$:

$$K_1 = \frac{\omega_{inj}}{n_{ext}^2}\int n_0(\bar{x})\Delta n(\bar{x}, V_1)\phi_1(\bar{x})\phi_2(\bar{x})d\bar{x} \approx \frac{\omega_{inj}}{n_{ext}}\Delta n_{eff}$$

where:

$$\Delta n_{eff} = \int \Delta n(\bar{x}, V_1)\phi_1(\bar{x})\phi_2(\bar{x})d\bar{x}$$

For light propagating in a waveguide, the phase shift change due $\Delta n_{eff}$ per mm length is:

$$\Delta\phi = k_{inj}\Delta n_{eff} \text{ [deg/mm]}$$

where $k_{inj} = \omega_{inj}/C$ is the wave number, and C is the vacuum speed of light. Comparing the expression for $K_1$ with the expression for $\Delta\phi$:

$$\tilde{K}_1 \approx \frac{C}{n_{ext}}\Delta\phi = \frac{C}{n_{ext}}A_o V_1$$

where $A_0$ is the differential electro-optic coefficient in deg/v/mm.

The following is an example of a solution of the algebraic rate equations given above, for a specific simplified case of a modulator with an input of an eigenmode (e.g. the symmetric normal mode). The assumption will have little affect on the following results. The output of the device is assumed as in FIG. 2, at the output waveguide 230. Assume that $\overline{q}_1 \gg$ $\bar{q}_{-1}$ and $\bar{q}_0 \gg \bar{q}_{-2}$, thus the algebraic equations are rewritten as:

$$\begin{cases} (a) & \dfrac{2\alpha_m}{T}\bar{B} = -\tilde{P}\bar{q}_0 - \dfrac{i\tilde{K}_1}{2}\bar{q}_1 \\ (b) & i\omega_m \bar{q}_1 = -\tilde{P}\bar{q}_1 - \dfrac{i\tilde{K}_1}{2}\bar{q}_0 \end{cases}$$

Using the assumption that the input is an eigenmode, the solution is limited to a combination of a DC term, $\bar{q}_0$, and the first harmonic, $\bar{q}_1$.

Further development of the equations yields:

$$\dfrac{2\alpha_m \bar{B}}{T} = -\tilde{P}\bar{q}_0 - \dfrac{1}{4}(\tilde{K}_1 M^{-1}\tilde{K}_1)\bar{q}_0$$

where $\bar{M} = i\omega_m \tilde{I} + \tilde{P}$, and $\tilde{I}$ is the unity matrix. Assuming excitation without DC term, i.e. $V_0=0$, so that $K_0=0$ and $$B = \begin{bmatrix} 1 \\ 0 \end{bmatrix},$$

it follows that:

$$\bar{q}_0 = \sqrt{P_0}\begin{bmatrix} 1 \\ 0 \end{bmatrix}$$

The value chosen for B implies, without loss of generality, an input of the lowest order normal mode of the DCD rather than a single sided input as originally assumed.

With $K_0=0$, as assumed, and using $\Delta\omega_i = (n_e^{(i)}\omega_{inj} - n_{ext}\omega_0)/n_{ext}$, $P_0$ can be expressed as:

$$\sqrt{P_0} = \dfrac{-2[1 + i(\omega_{inj} - \omega_R^{(2)} - (n_{ext}/n_e^{(2)})\omega_m)/\omega_H^{(2)}]}{[1 + i(\omega_{inj} - \omega_R^{(1)})/\omega_H^{(1)}]}$$
$$[1 + i(\omega_{inj} - \omega_R^{(2)} - (n_{ext}/n_e^{(2)})\omega_m)/\omega_H^{(2)}] + \dfrac{1}{4}K_1^2 / \left(\dfrac{\alpha_m}{T}\right)^2$$

where $\omega_R^{(1),(2)} = \omega_0 n_{ext}/n_e^{(1),(2)}$ are the resonance frequencies of the eigenmodes, and $\omega_H^{(1),(2)} = (n_{ext}/n_e^{(1),(2)})\alpha_m/T$ are the corresponding resonance widths, at full width at half maximum (FWHM). Thus the output DC power has a zero and a pole with respect to the RF modulation, and a zero and two poles with respect to the optical injected frequency. Assuming $K_1=0$, that is no RF signal is applied, it can be seen that $V_1$ is resonantly amplified for $\omega_{inj}=\omega_R^{(1)}$.

To maximize output power, let $\omega_{inj}=\omega_R^{(1)}$ (optical resonance of mode 1) and:

$$\omega_m = \dfrac{-\Delta\omega_{12}n_{ext}}{n_{e(2)}} \approx -\Delta\omega_{12}$$

where $\Delta\omega_{12} = (\omega_R^{(1)} - \omega_R^{(2)})$. Thus:

$$\sqrt{P_0} = \dfrac{-2\left(\dfrac{\alpha_m}{T}\right)^2}{\left(\dfrac{\alpha_m}{T}\right)^2 + \dfrac{1}{4}K_1^2}$$

Note that for $K_1=0$ (i.e., with $V_1 32\ 0$) $P_0=4$, but for $K_1>0$ (i.e., with $V_1>0$) $P_0<4$. Thus the DC component is depleted by the presence of the AC modulation via $K_1$.

Inspecting the pair of algebraic equations developed above, yields that $\bar{q} \propto \bar{V}_2$, that is:

$$\bar{q}_1 = \sqrt{P_1}\begin{bmatrix} 0 \\ 1 \end{bmatrix} \text{ and:}$$

$$\sqrt{P_1} = \dfrac{iK_1\left[1 + i\dfrac{(\Delta\omega_{12} + \omega_m)}{\omega_0^1}\right]}{\omega_0^1\left[1 + \dfrac{1}{4}(K_1/\omega_0^1)^2 + i\dfrac{\Delta\omega_{12} + \omega_m}{\omega_0^1}\right]\left[1 + i\dfrac{\Delta\omega_{12} + \omega_m}{\omega_0^1}\right]}$$

For resonance $\Delta\omega_{12} = -\omega_m$, and:

$$\sqrt{P_1} = \dfrac{iK_1}{\omega_0\left[1 + \dfrac{1}{4}(K_1/\omega_0)^2\right]} = \dfrac{iK_1 \dfrac{\alpha_m}{T}}{\left(\dfrac{\alpha_m}{T}\right)^2 + \dfrac{1}{4}K_1^2}$$

Thus, as expected, the RF field via $K_1$ couples power from the DC injected optical field to the first harmonic at frequency $\omega_m$.

The above analysis demonstrates the significance of the modulator phase tuning and coupling coefficient (via $\Delta\omega_{12}$) on modulator performance. In the preferred embodiment, the modulator phase tuning is at a value that brings a mode of the modulator to resonance ($\omega_{inj}=\omega_R^{(1)}$). Phase tuning a cavity is comparable to adjusting the optical length of the cavity. In a further preferred embodiment, the modulator phase may be tuned during operation to the appropriate value. The modulator may comprise a phase tuner, which is used to tune the modulator phase. For certain modulator configurations, a common phase shift can be created by heating or cooling the modulator, and/or via the electro-optic effect.

Similarly, in the preferred embodiment the coupling coefficient is set, and/or tuned, so that the frequency difference between the resonant frequencies of the two modulator modes equals the modulation frequency of the RF signal ($\omega_m = -\Delta\omega_{12}$), or, in some cases, an integer multiple of the modulation frequency. The modulator may comprise a coupling coefficient adjuster, which is used to tune the coupling coefficient.

A third modulator parameter that is significant for modulator function is the normal mode coupling rate, $K_1$. The following analysis demonstrates the normal mode coupling rate requirements for efficient modulator operation.

In the lossless case modulator optical losses are due only to reflection losses at the coupling elements, for example at coupling elements 250 and 260 in FIG. 2. Using the above expressions for $\bar{A}(t)$, $\bar{q}_0$, and $\bar{q}_1$, the output field is given approximately by:

$$\bar{A}(t) = q_0 + \bar{q}_1 e^{i\omega_n t} \cong \sqrt{P_0}\begin{bmatrix} 1 \\ 0 \end{bmatrix} + \sqrt{P_1}\begin{bmatrix} 0 \\ 1 \end{bmatrix}e^{i\omega_n t}$$

The corresponding field outside the cavity is dependent on the output waveguide configuration. Assuming output at the opposite waveguide, the corresponding output power is given as:

$$A_{out}(t)A_{out}^*(t) \cong \dfrac{|P_0| + |P_1| - 2\left|\sqrt{P_0}\sqrt{P_1}\right|\cos(\omega_m t + \phi_{\sqrt{P_1},\sqrt{P_0}})}{2}$$

where $$\phi_{\sqrt{P_1}\sqrt{P_0}}$$

is the phase of $$|\sqrt{P_0}\sqrt{P_1}|.$$

Note that the output signal has no chirp.

A maximum extinction ration (ER=∞) is obtained for:

$$|\sqrt{P_0}| = |\sqrt{P_1}|$$

The optimal operating condition can be shown to be:

$$\left|\frac{2\alpha_m}{T}\right| = K_1$$

The corresponding DC and first harmonic powers are:

$$\sqrt{P_0}\Big|_{opt} = -1/\sqrt{2} \quad \text{and:} \quad \sqrt{P_1}\Big|_{opt} = i/\sqrt{2}$$

respectively.

Thus for an input of an eigenmode and output of on side, the maximum output power is 2 and the minimum is 0. If the input is not an eigenmode as assumed but rather a single sided input (i.e. from a single waveguide), the maximum power is 1.

In the case of a lossy modulator, the expression for the optimal $K_1$ is modified. If the light in the cavity incorporates propagation loss, the propagation constant becomes complex, i.e. $\beta_i = \beta'_i - i\alpha_{sc}/2$, where $\alpha_{sc}$ is the (power) loss constant of the modes in the waveguide. Thus, the round-trip modal propagation in the cavity is given by $e^{-2i(\beta_i r - \beta_0)L - \alpha_{sc}L} \equiv e^{-i\Delta\omega'_i T}$ where, as before, $\Delta\omega'_i T \equiv 2(\beta_i - \beta_0)L$ and $\Delta\omega'_i$ is the modified version of the previous $\Delta\omega_i$. The rate equation can now be rewritten as:

$$\frac{d\bar{A}^t}{dt} = -\frac{2\alpha_m}{T}\bar{B}^t - \left[\frac{\alpha_m}{T} + \alpha^t_{sc}/2 + i\Delta\tilde{\omega}(t)\right]\bar{A}^t$$

where $\alpha_{sc}^t = \alpha_{sc} C/n_0$.

Consequently, the DC power component is:

$$\sqrt{P_0} = \frac{-2\left(\frac{\alpha_m}{T}\right)^2}{\left(\frac{\alpha_m}{T} + \alpha^t_{sc}/2\right)^2 + \frac{1}{4}K_1^2}$$

and the first order power component is:

$$\sqrt{P_1} = \frac{iK_1\left(\frac{\alpha_m}{T}\right)^2}{\left(\frac{\alpha_m}{T} + \alpha^t_{sc}/2\right)\left[\left(\frac{\alpha_m}{T} + \alpha^t_{sc}/2\right)^2 + \frac{1}{4}K_1^2\right]}$$

Since the maximum extinction ratio is obtained for $$|\sqrt{P_0}| = |\sqrt{P_1}|,$$

the optimal value for $K_1$ is modified by the optical loss term, yielding:

$$2\left|\frac{\alpha_m}{T} + \alpha^t_{sc}/2\right| = K_1$$

The peak output power is:

$$P_{outmax} = 2P_0 = 2\frac{\left(\frac{\alpha_m}{T}\right)^4}{\left(\frac{\alpha_m}{T} + \alpha^t_{sc}/2\right)^4}$$

In accordance with the above analysis, in the preferred embodiment the coupling rate between the modes equals, or is tunable to, the total optical loss within the modulator cavity or cavities. The modulator may comprise a mode coupling rate adjuster, which is used to tune the modal coupling coefficient.

Note that, as explained above, the coupling rate, $K_1$, is totally unrelated to the coupling coefficient which determines the resonant frequency separation, $\Delta\omega_{12}$. The modal coupling coefficient is controlled by the applied RF field, whereas the coupling coefficient is mainly a structural parameter.

In the preferred embodiment, the modulator contains a signal generator, which generates the electrical control signal used to modulate the injected optical signal. The control signal may be generated by any known methods, such as by applying a voltage signal to a set of electrodes. Various types of control signals may be used, depending on the required modulation. Examples of control signal types include anti-symmetric and single-sided signals.

In the preferred embodiment the modulator has optical gain so that the optical signal is amplified by the modulator. In some modes of operation, the internal gain will cause the modulator to self-oscillate at the modulation frequency. In an alternate preferred embodiment, the modulator does not provide gain, and operates solely upon externally injected light.

In the preferred embodiment, the modulator is formed by coupling three or more cavities together. Increasing the number of cavities in the device may permit operation at more than one control signal modulation frequency, or over a wider injected carrier optical bandwidth.

The modulator described above has several modes of operation. Two of these operating modes are described below.

Figure 5:
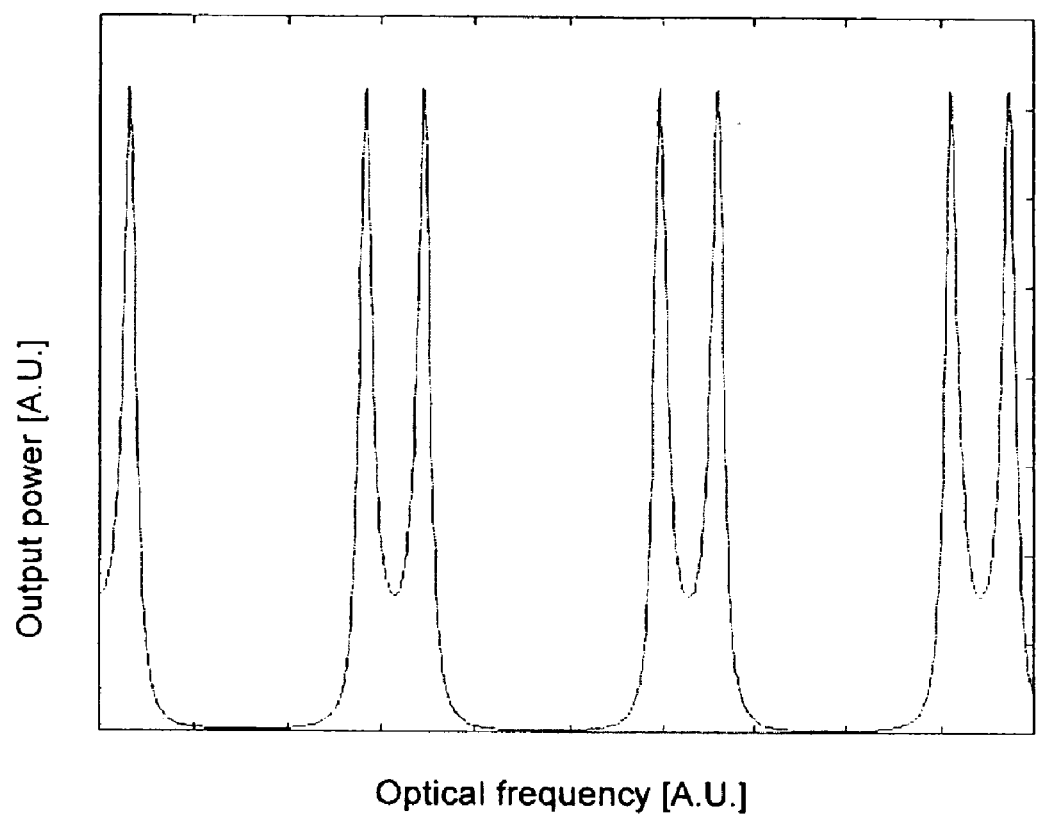
FIG. 5 shows the passive wavelength response of a coupled waveguide optical modulator vs. the wavelength tuning.

Reference is now made to FIG. 5, which is a graph of output power against optical frequency, and which shows the passive wavelength response of a coupled waveguide optical modulator vs. the wavelength tuning (given in this case in radians). As expected from the cavity nature of the device, the pattern repeats itself according to the cavity's free spectral range (FSR). The patterns of two adjacent peaks result from the nature of the device being two coupled Fabry-Perot cavities. The frequency difference between two adjacent peaks is proportional to the difference between the effective index of the symmetric and the anti-symmetric modes of the coupled waveguides, which is proportional to the evanescent coupling between the waveguides. The model suggests that the device should be designed so that the optical frequency difference between the symmetric and anti-symmetric modes should be equal to the desired output optical modulation frequency.

Figure 6:
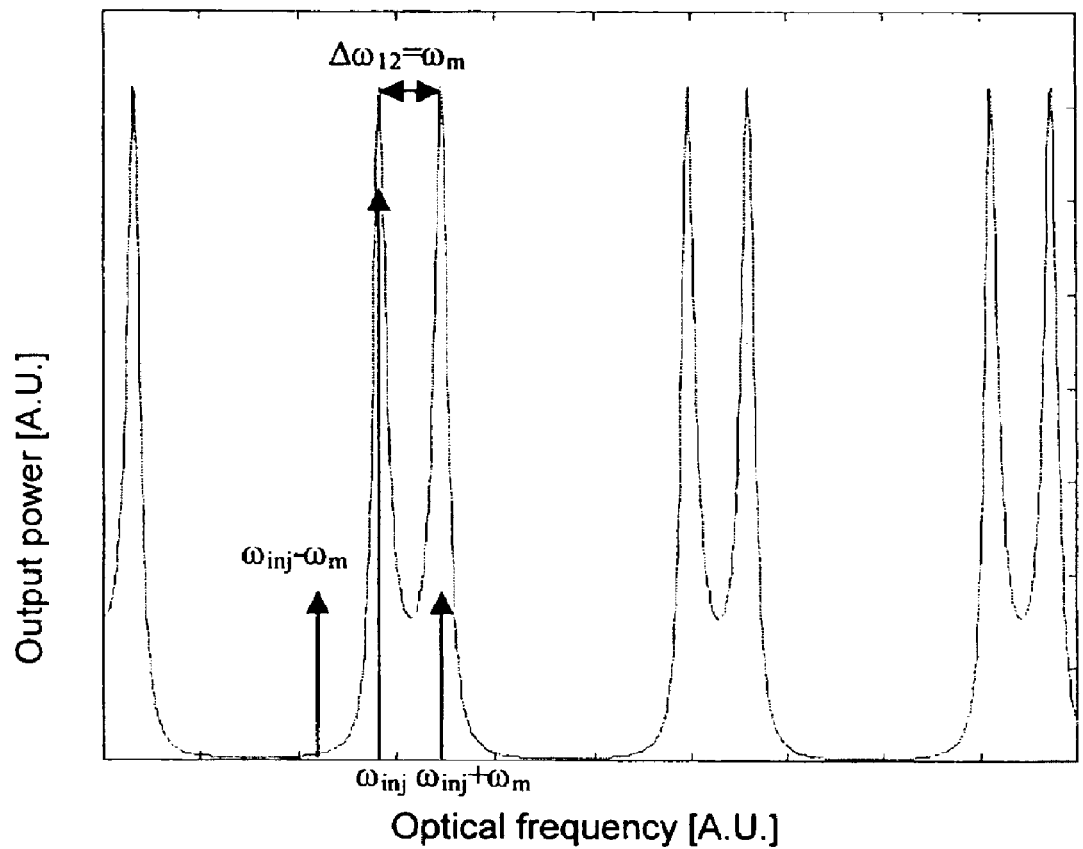
FIGS. 6 and 7 show the response of a modulator to light injected at the optical frequency of one of the peaks.
Figure 7:
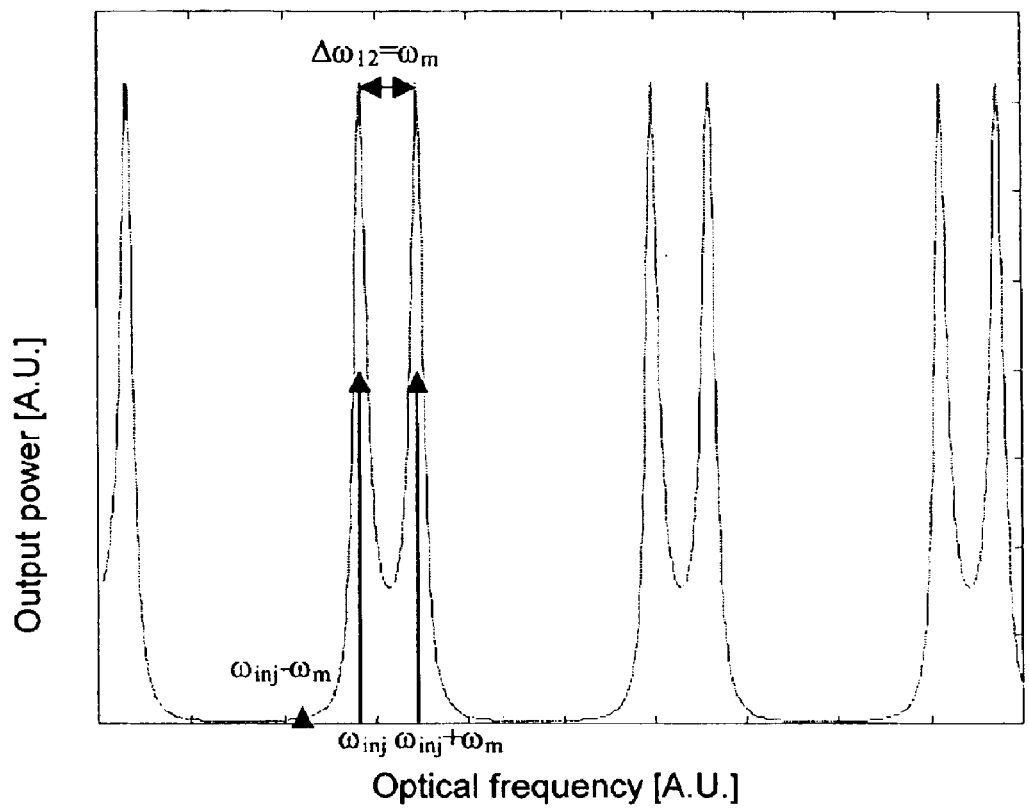

One mode of operation of the modulator, is the injection of light at the same optical frequency (wavelength) as one of the peaks (or alternatively, to phase tune the cavity so that the peak is placed at the optical frequency of the input light). Without limitation of generality, it is assumed that the input wavelength is equal to the wavelength of the left-side peak. By applying an RF signal to the electrodes, side lobes are created at the two sides of the input optical frequency, which are distant from it by the RF frequency itself. FIGS. 6 and 7, which are also graphs of output power against optical frequency, illustrate the response of a modulator to light injected at the optical frequency of one of the peaks. In FIG. 6, the optical power of the injected light at frequency $\omega_{inj}$ and the side-lobes $\omega_{inj}-\omega_m$ and $\omega_{inj}+\omega_m$ are marked with arrows, with respect to the optical response of the modulator.

As shown in FIG. 7, the left side-lobe is suppressed by the destructive interference in the cavity at its wavelength, while the right side lobe is enhanced by the resonance property of the device for its wavelength. If the RF power is properly chosen (according to the expression given above for the coupling coefficient $K_1$) the frequency response of the resulting optical signal at the modulator output consists of two optical signals of equal power at wavelengths $\omega_{inj}$ and $\omega_{inj}+\omega_m$. The sum of the two signals in the time domain gives one optical signal at optical frequency of $\omega_{inj}+\frac{1}{2}\omega_m$, and which beats at the frequency $\omega_m$, as desired.

Figure 8:
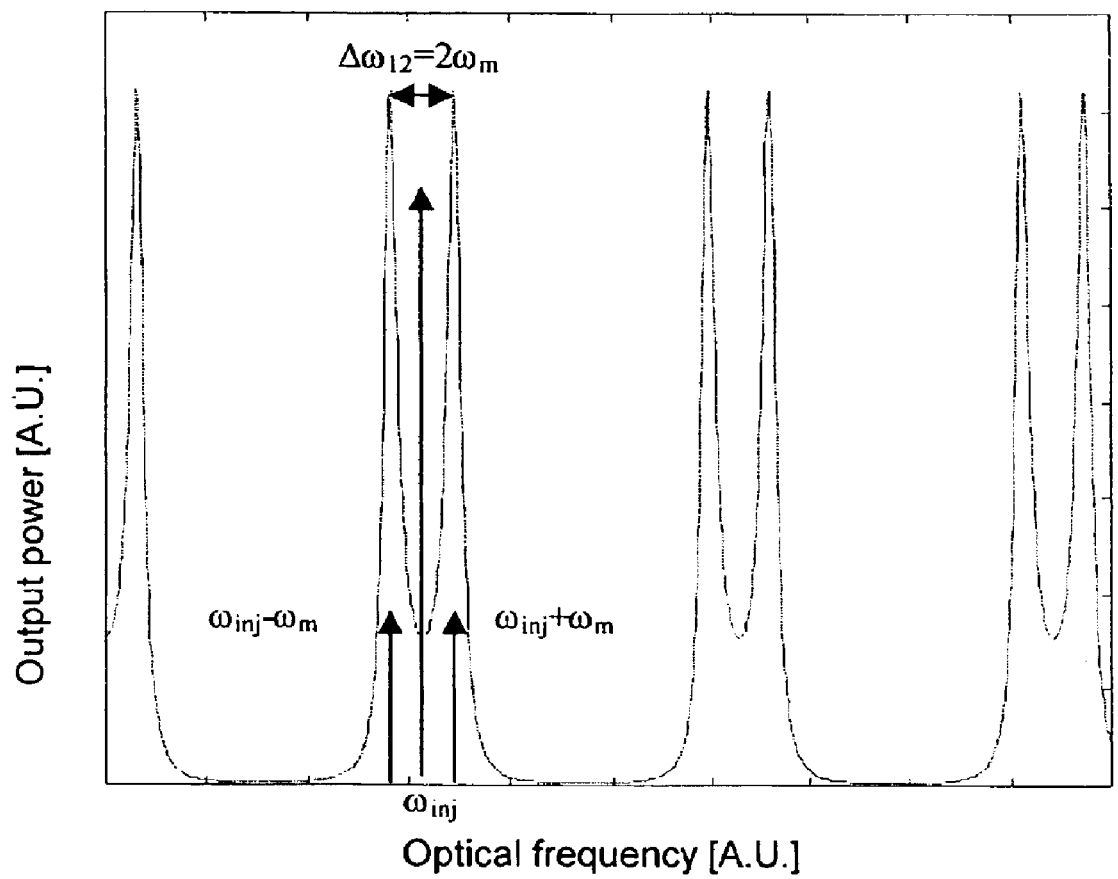
FIG. 8 shows the modulator frequency response to an input light signal injected in the dip between the resonance peaks of the device.

Reference is now made to FIG. 8, which is a graph of output power against optical frequency, and which illustrates the modulator frequency response to an input light signal injected in the dip between the resonance peaks of the device. The correct RF frequency in this case equals half the desired modulation signal. If the RF power is properly chosen, the energy of the optical input signal may be transferred entirely to its two side-lobes.

Figure 9:
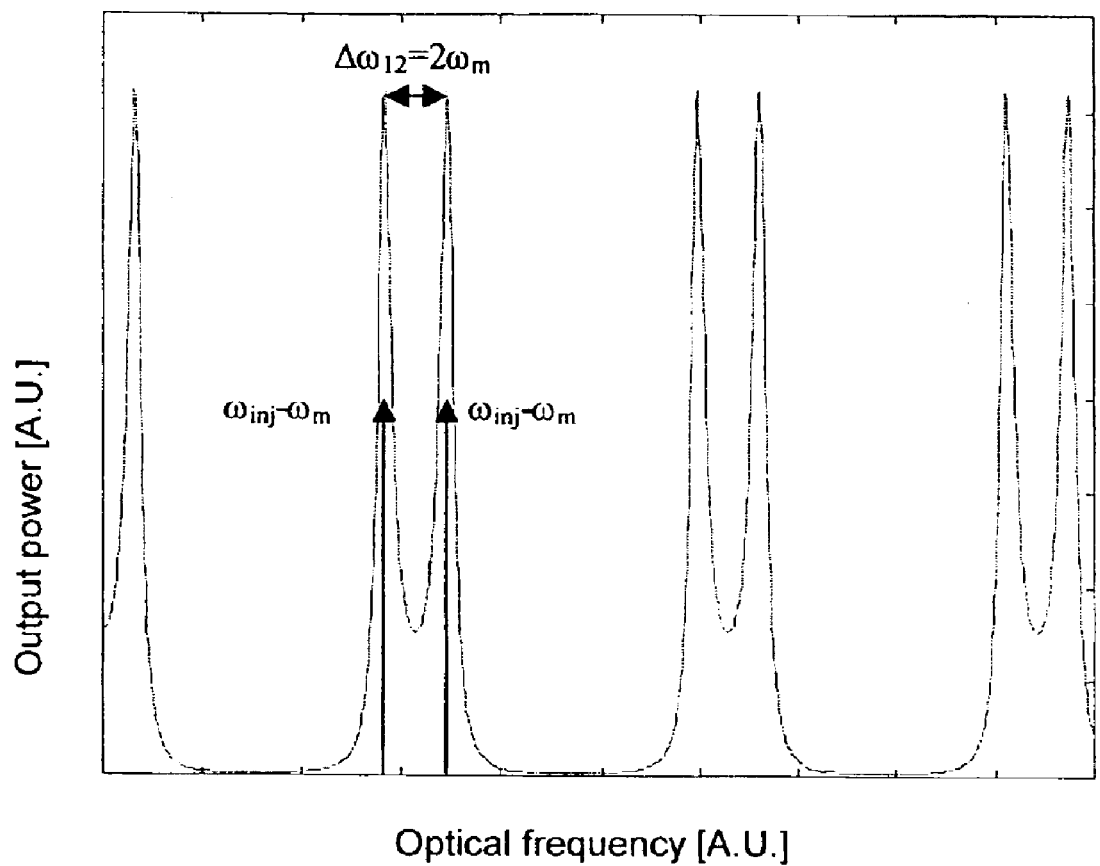
FIG. 9 shows response of the optical modulator to an RF signal at half the desired modulation frequency.

The output of the optical modulator to an injected light signal at half the desired modulation signal is shown in FIG. 9, which is a graph of output power against optical frequency. The sum of the two signals in time domain gives one optical signal at optical frequency of $\omega_{inj}$, beating at the frequency $2\omega_m$. The advantage of adopting the second mode of operation is the ability to use half the RF frequency, and to avoid an optical frequency shift of the output signal.

Figure 10:
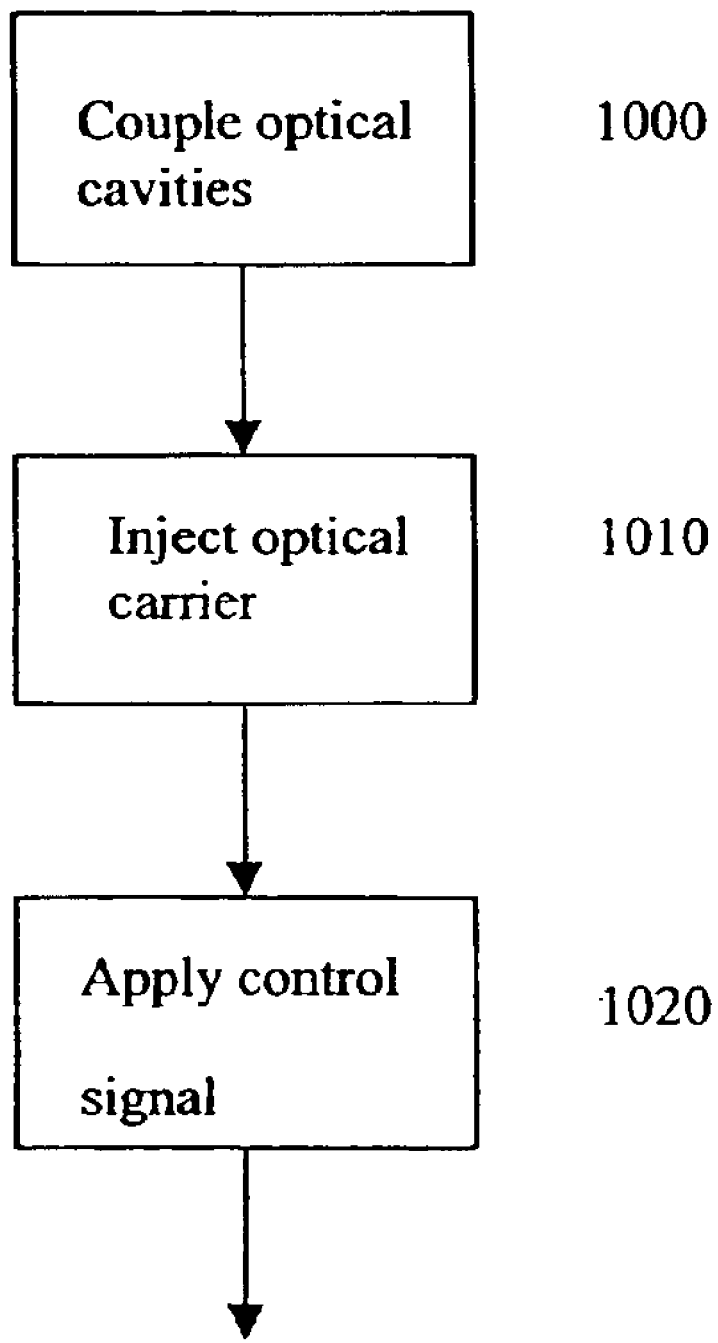
FIG. 10 is a simplified flowchart of a method for providing an optical signal modulated with a selectable frequency.

Reference is now made to FIG. 10, which is a simplified flowchart of a preferred embodiment of a method for providing an optical signal modulated with a selectable frequency. In step 1000, at least two optical cavities are coupled together. When the cavities are coupled according to the conditions described above, an electromagnetic control signal applied to the coupled cavities can shift the optical wavelength of an injected optical signal and redistribute power between resonant modes of the modulator. In step 1010, an optical carrier is injected into the modulator; and in step 1020 the control signal is applied. Modulator parameters, such as phase tuning, coupling rate, and coupling coefficients may be adjusted during operation, to optimize the power distribution and create the desired modulation.

Figure 11:
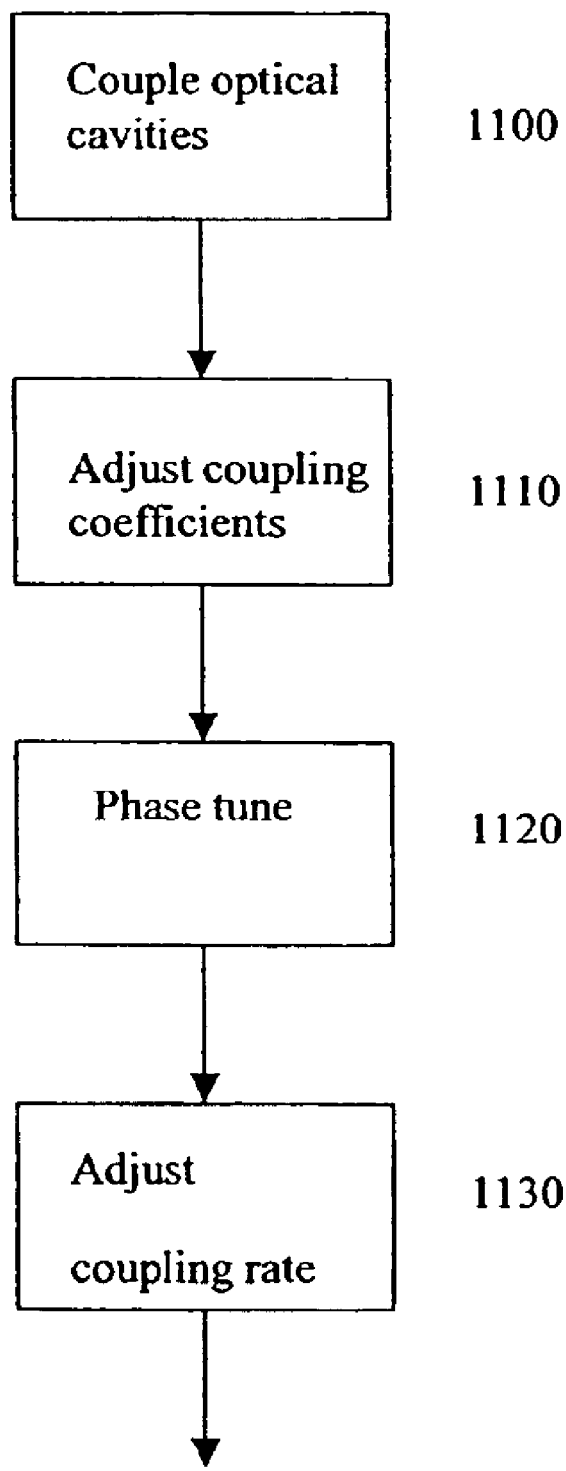
FIG. 11 is a simplified flowchart of a method for manufacturing a narrow-band optical modulator.

Reference is now made to FIG. 11, which is a simplified flowchart of a preferred embodiment of a method for manufacturing a narrow-band optical modulator. The modulator principles of design and operation are as described above. In step 1100, at least two optical cavities are coupled together. In the following steps the cavity parameters are set to the required values. Alternately, the parameters may be tuned to values sufficiently close to the required values, so that further adjustment can be performed later during modulator operation to bring the modulator into proper operation. In step 1110 the coupling coefficients between the cavities are adjusted so that the frequency difference between the mode frequencies equals the expected control signal frequency or an integer multiple thereof. The coupled cavities are phase tuned in step 1120, to bring one of the modes is into resonance. The method ends at step 1130, when the coupling rate between the modes is set equal to the total optical loss in the cavities. Alternately, the three modulator parameters can be adjusted in any order required by the manufacturing process.

The above described embodiments illustrate the design principles and mode of operation of a coupled waveguide optical modulator. The coupled waveguide can serve as both an optical clock and a data modulator, and has a variety of operating modes. The optical modulator operates more efficiently than currently existing modulators, therefore requiring significantly lower RF power and modulator size. Lower modulator size and power is a significant design consideration for optical system developers, and is a major modulator over existing devices.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof which would occur to persons skilled in the art upon reading the foregoing description.

I claim:

1. An optical modulator comprising:
   an electrical input configured-for receiving an electrical control signal in a narrow frequency band at a predetermined high frequency,
   an optical output for outputting an optical signal, and
   at least two optical cavities coupled together according to a set of coupling parameters selected to match said narrow-band, and wherein said predetermined high frequency corresponds to a period shorter than a lifetime of photons within at least one of said coupled cavities.

2. An optical modulator according to claim 1, wherein each of said cavities comprises an optical waveguide.

3. An optical modulator according to claim 1, further comprising an optical input for light injection.

4. An optical modulator according to claim 1, wherein said modulator is operable to internally generate light.

5. An optical modulator according to claim 1, wherein said modulator is operable to shift an optical wavelength of said optical signal according to said electrical control signal so as to redistribute power between resonant modes of said modulator.

6. An optical modulator according to claim 1, wherein said modulator is operable as a data modulator.

7. An optical modulator according to claim 1, wherein said modulator is operable as a narrow-band data modulator.

8. An optical modulator according to claim 1, wherein said modulator is operable as a sinusoidal amplitude modulator.

9. An optical modulator according to claim 1, wherein said modulator is operable simultaneously as a sinusoidal amplitude modulator and as a data modulator.

10. An optical modulator according to claim 1, wherein said modulator is operable as a single sideband (SSB) modulator.

11. An optical modulator according to claim 5, being operable to modulate said optical signal with an electric control signal having a predetermined modulation frequency within said narrow-frequency band, said modulation dropping as said modulation frequency departs from said narrow-band.

12. An optical modulator according to claim 1, further comprising a phase tuner for tuning a phase of said cavity.

13. An optical modulator according to claim 1, further comprising a coupling coefficient adjuster for adjusting a coupling coefficient between said cavities.

14. An optical modulator according to claim 1, further comprising a mode coupling rate adjuster for adjusting a normal mode coupling rate between resonant modes of said modulator.

15. An optical modulator according to claim 12, wherein a phase of said modulator is tunable such that a mode of said modulator is at resonance.

16. An optical modulator according to claim 1, wherein a phase of said modulator is tunable such that a mode of said modulator is at resonance.

17. An optical modulator according to claim 1, having an optical length such that a mode of said modulator is at resonance.

18. An optical modulator according to claim 5, wherein one of said modes is at resonance.

19. An optical modulator according to claim 13, wherein a coupling coefficient between said cavities is adjustable such that a frequency difference between a resonant frequency of a first mode of said coupled cavities and a resonant frequency of a second mode of said coupled cavities substantially matches an integer multiple of said modulation frequency.

20. An optical modulator according to claim 1, wherein a coupling coefficient between said cavities is adjustable such that a frequency difference between a resonant frequency of a first mode of said coupled cavities and a resonant frequency of a second mode of said coupled cavities substantially matches an integer multiple of said modulation frequency.

21. An optical modulator according to claim 20, wherein said coupling coefficient comprises a waveguide coupling coefficient.

22. An optical modulator according to claim 1, having a coupling coefficient such that a frequency difference between a resonant frequency of a first mode of said coupled cavities and a resonant frequency of a second mode of said coupled cavities substantially matches an integer multiple of said modulation frequency.

23. An optical modulator according to claim 5, wherein a frequency difference between a resonant frequency of a first mode of said modulator and a resonant frequency of a second mode of said modulator substantially equals an integer multiple of said modulation frequency.

24. An optical modulator according to claim 14, wherein said normal mode coupling rate is adjustable such that said coupling rate substantially equals a total optical loss in the cavities of said modulator.

25. An optical modulator according to claim 1, wherein a coupling rate between resonant modes of said modulator is adjustable such that said normal mode coupling rate substantially equals a total optical loss in the cavities of said modulator.

26. An optical modulator according to claim 1, having a coupling rate between resonant modes of said modulator such that said normal mode coupling rate substantially equals a total optical loss in the cavities of said modulator.

27. An optical modulator according to claim 11, wherein said second optical signal comprises a narrow-band signal.

28. An optical modulator according to claim 11, wherein said control signal comprises a narrow-band signal.

29. An optical modulator according to claim 5, wherein a first mode comprises a symmetric mode of said modulator and said second mode comprises an anti-symmetric mode of said modulator.

30. An optical modulator according to claim 5, further comprising a signal generator, for generating said control signal.

31. An optical modulator according to claim 1, wherein a type of at least one of said cavities includes one of a group comprising: Fabry-Perot cavity, distributed feedback (DFB) cavity, distributed Bragg reflection (DBR) cavity, vertical cavity, metallic cavity, circular cavity, race track cavity, triangular cavity, free space cavity, photonic bandgap cavity, and multimode cavity.

32. An optical modulator according to claim 5, wherein said control signal comprises an anti-symmetric signal.

33. An optical modulator according to claim 5, wherein said control signal comprises a single-sided signal.

34. An optical modulator according to claim 1, wherein said modulator is operable as an optical clock.

35. An optical modulator according to claim 34, wherein an oscillation frequency of said optical clock comprises an integer multiple of said modulation frequency.

36. An optical modulator according to claim 1, further comprising a first and a second mirror associated with said cavities, and wherein said first mirror comprises a semi-transparent mirror thereby to couple said cavities.

37. An optical modulator according to claim 36, wherein said second mirror comprises a semitransparent mirror.

38. An optical modulator according to claim 36, wherein said second mirror comprises a fully reflective mirror.

39. An optical modulator according to claim 36, wherein said first mirror comprises a modulator output.

40. An optical modulator according to claim 37, wherein said second mirror comprises a modulator output.

41. An optical modulator according to claim 1, having optical gain.

42. An optical modulator according to claim 41, wherein said modulator is operable to self-oscillate at said modulation frequency.

43. An optical modulator according to claim 1, comprising at least three optical cavities, thereby to operate at more than one modulation frequency.

44. An optical modulator according to claim 1, comprising at least three optical cavities, thereby to operate over a predetermined bandwidth.

45. An optical modulator comprising:
  an electrical input configured for receiving a narrow-band electrical control signal at an externally selected control frequency,
  an optical output for outputting an optical signal from said modulator, and
  at least one optical cavity associated with said electrical input and said optical output, arranged to support at least two optical modes having respective resonance wavelengths selected in accordance with said control frequency, and wherein said control frequency is selected to have a period which is shorter than a photon lifetime within said cavity.

46. An optical modulator according to claim 45, being operable to shift an optical wavelength of an optical signal according to said electrical control signal, thereby to control optical power in resonant modes of said cavity.

47. An optical modulator according to claim 45, wherein said externally selected control signal frequency is set to have a period significantly shorter than the lifetime of photons within said cavity.

48. An optical modulator according to claim 45, wherein said optical modes comprise axial cavity modes.

49. An optical modulator according to claim 45, wherein said optical modes comprise normal modes.

50. An optical modulator according to claim 45, wherein said optical modes comprise normal waveguide modes.

51. An optical modulator according to claim 45, further comprising an optical input for light injection.

52. An optical modulator according to claim 45, having an internal optical gain of substantially one.

53. An optical modulator according to claim 45, having an internal optical loss.

54. An optical modulator according to claim 45, further comprising a second cavity coupled to said first cavity according to a set of coupling parameters selected to define said narrow-band.

55. An optical modulator according to claim 54, further being operable to shift an optical wavelength of an injected optical signal according to characteristics of said electrical control signal, thereby to redistribute power between resonant modes of said modulator.

56. An optical modulator according to claim 45, wherein a frequency separation of two of said optical modes corresponds to an integer multiple of said externally selected control frequency, thereby to oscillate at said control frequency.

57. A method for providing an optical signal modulated with a selectable frequency, said method comprising:

applying an electro-magnetic control signal to an optical cavity at a first predetermined frequency, such that an optical wavelength of an optical signal is shifted by said electro-magnetic control signal so as to redistribute power between resonant modes of a modulator;

injecting an optical signal into said optical cavity; wherein said first predetermined frequency has a period shorter than a lifetime of a photon within said optical cavity.

58. A method for providing a modulated optical signal according to claim 57, wherein said optical cavity comprises at least two coupled waveguides.

59. A method for providing a modulated optical signal according to claim 58, further comprising adjusting coupling coefficients between said cavities such that a frequency difference between a resonant frequency of a first mode of said coupled cavities and a resonant frequency of a second mode of said coupled cavities substantially equals an integer multiple of a modulation frequency of said control signal.

60. A method for providing a modulated optical signal according to claim 58, further comprising phase tuning said coupled cavities such that a mode of said coupled cavities is at resonance.

61. A method for providing a modulated optical signal according to claim 58, further comprising adjusting a coupling rate between a first mode and a second mode of said coupled cavities such that said normal mode coupling rate substantially equals a total optical loss of said coupled cavities.

62. A method for providing a modulated optical signal according to claim 58, wherein said injected optical signal comprises a narrow-band signal.

63. A method for providing a modulated optical signal according to claim 58, wherein said control signal comprises a narrow-band signal.

64. A method for providing a modulated optical signal according to claim 58, wherein a first mode of said coupled cavities comprises a symmetric and a second mode of said coupled cavities comprises an anti-symmetric mode.

65. A method for providing a modulated optical signal according to claim 58, wherein a type of at least one of said cavities includes one of a group comprising: Fabry-Perot cavity, circular cavity, race track cavity, free space cavity, photonic bandgap cavity, and multimode cavity.

66. A method for providing a modulated optical signal according to claim 58, wherein said control signal comprises an anti-symmetric signal.

67. A method for providing a modulated optical signal according to claim 58, wherein said control signal comprises a single-sided signal.

68. A method for providing a modulated optical signal according to claim 58, wherein said modulated optical signal comprises an optical clock signal.

69. A method for providing a modulated optical signal according to claim 68, wherein an oscillation frequency of said optical clock signal comprises a modulation frequency of said control signal.

70. A method for providing a modulated optical signal according to claim 58, wherein said coupled cavities comprise at least three optical cavities thereby to operate at more than one modulation frequency of said control signal.

71. A method for providing a modulated optical signal according to claim 58, wherein said coupled cavities comprise at least three optical cavities thereby to operate over a predetermined bandwidth of said control signal.

72. A method for manufacturing a narrow-band optical modulator, said method comprising:

coupling together two optical cavities;

adjusting coupling coefficients between said cavities such that a frequency difference between a resonant frequency of a first mode of said coupled cavities and a resonant frequency of a second mode of said coupled cavities substantially equals an integer multiple of a modulation frequency within a predetermined frequency range;

phase tuning said coupled cavities such that one of said modes is substantially at resonance;

adjusting a coupling rate between said resonant modes such that said normal mode coupling rate substantially equals a total optical loss of said modulator, and providing a control input for providing a control signal at a frequency having a period which is shorter than a lifetime for photons within at least one of said coupled cavities.

73. The optical modulator of claim 1, wherein said period is shorter than a lifetime of photons within both of said coupled cavities.

* * * * *